United States Patent [19]

Gibson

[11] Patent Number: 4,689,856
[45] Date of Patent: Sep. 1, 1987

[54] MATERIAL FORMING APPARATUS

[75] Inventor: Royce G. Gibson, Murwillumbah, Australia

[73] Assignee: Tendapak Holdings Pty. Limited, Brisbane, Australia

[21] Appl. No.: 821,740
[22] PCT Filed: Apr. 19, 1985
[86] PCT No.: PCT/AU85/00087
 § 371 Date: Feb. 19, 1986
 § 102(e) Date: Feb. 19, 1986
[87] PCT Pub. No.: WO85/04784
 PCT Pub. Date: Nov. 7, 1985

[30] Foreign Application Priority Data

Apr. 19, 1984 [AU] Australia .............................. PG4671

[51] Int. Cl.[4] .............................................. A22C 7/00
[52] U.S. Cl. ................................................... 17/32
[58] Field of Search ........................................... 17/32

[56] References Cited

U.S. PATENT DOCUMENTS 1,741,023 12/1929 Kajiwara ................................. 17/32
2,413,046 12/1946 Holly .
3,213,486 10/1965 Blake ................................... 17/32 X
3,691,594 9/1972 Klein ..................................... 17/32
3,869,757 3/1975 Holly .................................... 17/32
4,091,504 5/1978 Wong .................................... 17/32
4,106,160 8/1978 Jentsch .................................. 17/32
4,302,173 11/1981 Persson .................................. 17/32

FOREIGN PATENT DOCUMENTS 11268 8/1971 Australia .
47575 5/1974 Australia .
23383 6/1984 Australia .

Primary Examiner—Willie G. Abercrombie
Attorney, Agent, or Firm—Browdy and Neimark

[57] ABSTRACT

An apparatus (10) for forming paste-like materials into discrete product units, comprising an elongate, open ended tube (11) of substantially constant internal cross-sectional shape, an inlet port (37) through the wall of the tube intermediate its ends to allow the entry of the paste-like material into the interior of the tube, first and second piston members (12, 13) spaced apart in axial alignment and adapted to be moved together relative to the tube between a position in which the space between them is effectively external of the tube and a position in which that space is completely within the tube and in communication with the inlet port therein.

6 Claims, 2 Drawing Figures

MATERIAL FORMING APPARATUS

FIELD OF THE INVENTION

The present invention relates to apparatus for forming paste-like materials into discrete product units and more particularly to apparatus of the type which can form such discrete product units from paste-like materials containing fibrous ingredients.

BACKGROUND OF THE INVENTION

It is well known to form elongate articles of uniform cross-section by continuously extruding a run of the material in a suitable cross-sectional form and periodically severing the extrusion to produce a plurality of the articles of the required length. It has been found that this regular severing does not work satisfactorily when the extrusion is of a material containing fibres as in the case of the fibrous meat products the subject of copending Australian patent application (No. PG4670) entitled "Meat Product and Process".

SUMMARY OF THE INVENTION

The present invention provides an alternative apparatus for forming paste-like materials, including the meat product described above, into discrete product units.

The present invention consists of apparatus for forming paste-like materials into discrete product units comprising an elongate, open ended tube of substantially constant internal cross-sectional shape, an inlet port through the wall of the tube intermediate its ends to allow the entry of paste-like material into the interior of the tube, a piston means including first and second piston members spaced apart in axial alignment and adapted to be moved together relative to the tube between a first position in which the space between them is effectively external of the tube and a second position in which that space is completely within the tube and in communication with the inlet port therein.

In another aspect, the present invention consists of a method for the formation of discrete product units of a paste-like material, comprising introducing the paste-like material under pressure through an inlet port into a space defined within a tube of substantially constant internal cross-sectional shape and bounded at either end by a pair of spaced apart piston members, moving the pistons together relative to the tube such that the space between the pistons is effectively external of the tube, and removing the product unit from between the piston members.

The tube is preferably a tube of stainless steel or like material which may be of any desired internal cross-sectional shape. The tube has intermediate its ends an inlet port for the material to be formed into discrete product units and a bleed hole for air. The material is supplied through a suitable line from a pressurized source to the inlet port.

The piston means preferably comprises a pair of elongate pistons which are a close sliding fit within the bore of the tube. These pistons are preferably joined together externally of the tube in a manner such that the distance between the opposed faces of the axially aligned pistons may be varied to enable the length of the discrete product units to be correspondingly varied. It will be appreciated that the cross-sectional shape of the formed unit will be determined by the cross-sectional shape of the internal bore of the tube.

The piston members will be reciprocally mounted in a manner such that they may be moved between a first position in which one of the pistons is completely external of the tube and the active face of the other piston is at or projecting from an effective end of the tube and a second position in which the opposed, active, faces of the pistons are both within the tube and the space therebetween is in communication with the material inlet port and with the air bleed hole. In the second position the material will enter the space between the pistons displacing air through the bleed hole as it does so. As the pistons are together moved towards the first position the material between the pistons will be moved relatively along the tube. As this happens one of the pistons will pass across the entry port which simultaneously effects a closure of the port and a severing of the material which is within the space between the pistons from the supply of that material. If the material contains fibrous ingredients the piston can effect a clean separation of the discrete material unit being formed from the bulk supply of the material. The further travel of the unit of material along the tube between the pistons will also serve to confirm the clean lines of the unit so formed. When the pistons reach the first position the article will fall from between the pistons under the influence of gravity or may be removed therefrom by a gas blast, by mechanical means or in any other desired manner. As the pistons return to the second position the inlet port will be uncovered, material will flow into the space between the pistons within the tube and the cycle will be repeated.

If desired a lubricant may be applied to the end of the piston projecting from the tube to assist in freeing the formed article from that piston. This lubricant could be water, batter, an edible oil or the like depending upon the nature of the material being formed into discrete units.

The pistons are preferably not merely moved between the first and second positions but are preferably caused to undergo a short oscillation at each of those extreme positions in order to, in the second position, form the ends of the article clearly within the space between the pistons, and, in the first position, to clearly separate the article from the pistons.

The apparatus and method according to this invention allow a fibrous pasty material, particularly a meat paste containing many fibrous particles, to be formed into a discrete product unit with clean edges and no individual fibres discernable as projecting from the article.

The pistons may be caused to reciprocate within the tube in any known manner; however, it is preferred that the pistons are both linked, through a link arm, to an arm which is caused to rotate through an arc which is slightly greater than 180°. Such an arrangement can be used to produce a short oscillation of the pistons at at least one end of their travel.

It will be appreciated that the tube may not physically terminate at the point at which the material units are removed from between the pistons. If desired the tube may merely include an aperture or space through which the formed material unit may be removed from between the pistons. It is to be understood that such an arrangement falls within the scope of the present invention.

BRIEF DESCRIPTION OF THE DRAWINGS

Hereinafter given by way of example only is a preferred embodiment of the present invention described with reference to the accompanying drawings in which.

DETAILED DESCRIPTION OF THE DRAWINGS

Figure 1:
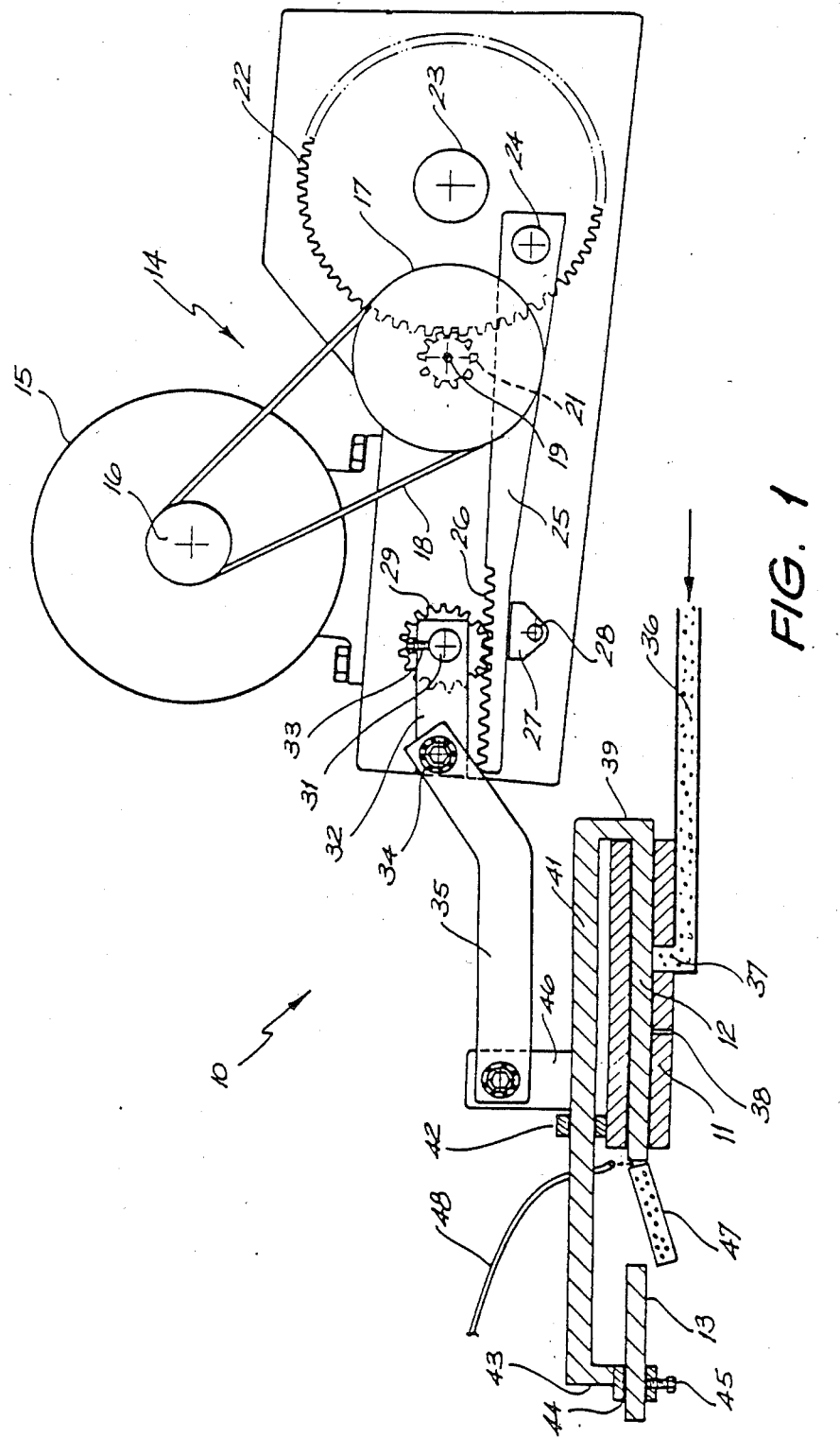
FIG. 1 is a diagrammatic cross-sectional view of an apparatus according to the present invention with the pistons in a position in which a formed material unit may be released.

The apparatus 10 is particularly designed for forming a paste-like dispersion of meat including fibrous strands of meat into discrete meat units such as meat "fingers" or meat "chips". In order to have appropriate consumer appeal and in order to reduce the possibility of bacterial spoilage it is desirable that the "fingers" or "chips" formed from the meat paste have no fibrous projections extending therefrom. A "whiskery" appearance is unacceptable in the market place. The present apparatus 10 accepts a pressurised supply of the meat paste and converts it into "fingers" of constant cross-sectional shape and of a predetermined length.

The apparatus 10 comprises essentially a tube 11 having a square section bore and, a pair of pistons 12 and 13 adapted to reciprocate relative to the tube 11 and a drive means 14 to bring about that reciprocation.

The drive means 14 includes an electric motor 15 which carries at one end a V-pulley 16. The electric motor 15 drives a reduction V-pulley 17 through vee belt 18. The V-pulley 16 is mounted on a shaft 19 which also carries a drive gear 21. The drive gear in turn drives a crank gear 22 which is considerably larger than the drive gear 22 to provide a further reduction in the rotational speed. The crank gear 22 is mounted on a further shaft 23 lying parallel with shaft 19.

The crank gear 22 carries a crank pin 24 extending laterally from the crank gear 22 parallel to the shaft 23 and located radially between the shaft 23 and circumferential teeth on the crank gear 22. A rack arm 25 is journalled onto the crank pin 24 at one of its ends and extends substantially tangentially from the crank gear 22. The end of the rack arm 25 distal to the crank pin 24 carries on its upper surface an array of rack teeth 26. The rack arm 25 is supported beneath the rack teeth 26 by a support pad 27 which is pivotaly mounted on pin 28 extending transversely of the axis of the rack arm 25.

A pinion 29 is mounted on a shaft 31 and has teeth which mesh with the rack teeth 26. An arc lever 32 extends radially of the shaft 31 to which it is adjustably connected by locking screw 33. The arc lever 32 is connected through a bearing 34 to crank arm 35. The crank arm 35 is in turn connected to the pistons 12 and 13 as will be hereinafter described.

In operation the drive means 14 causes the pistons 12 and 13 to reciprocate. The rotary motion of the electric motor is transmitted to crank gear 22 through pulley 16, vee belt 18, pulley 17, shaft 19 and gear wheel 21. The rotary motion of the crank gear 22 is converted into a reciprocating motion of the rack teeth 26. The reciprocation of the rack teeth causes an arcuate oscillation of the pinions 29 and the arc lever 32 which in turn causes a complex linear reciprocation of the crank arm 35. As the crank gear 22 rotates the crank pin 24 moves in a circular path and the rck teeth 26 move along an essentially linear path. The relationship between the crank wheel 22, crank pin 24, rack 25 and pinion 29 is such that the pinion will oscillate through an arc of 250°, which arc takes the arc arm 34 above a notional horizontal line through the axis of shaft 31. This means that the free end of the crank arm 35 will, in one counter-clockwise cycle of the arc lever 32, move away from the pinion 29, as the arc lever 32 moves down to the said notional horizontal line, then moves towards the pinion 29, as the arc lever 32 is moved through 180° and again meets the notional horizontal line, and finally moves away from the pinion 29, as the arc lever 32 rises above the notional horizontal line. As the pinion 29 is moved back in a clockwise direction the reciprocation of the free end of the crank arm 35 will be opposite to that described.

The tube 11 is of square section and has a square section bore. The pistons 12 and 13 are of square cross-sections and are a close sliding fit in the bore of the tube 11. The tube 11 is mounted in a stationary manner on a frame (not shown) of the apparatus. A duct 36 carrying meat paste from a pressurised container (not shown) is operatively connected to the bore of the tube 11 through an inlet port 37 in the tube 11. A narrow diameter air bleed hole 38 is provided in the tube adjacent the inlet port 37.

The piston 12 comprises one arm of a C-shaped member, the piston 12 being connected to a vertical member 39 which is in turn connected to a horizontal member 41 lying parallel to piston 12 above the tube 11. The horizontal member 41 is considerably longer than tube 11 and is supported thereon by nylon bush 42. At its end distal to member 39 the horizontal member 41 is connected to a further vertical member 43 formed at its free end with an aperture 44 into which the piston 13 fits and is held in axial alignment with piston 12 by locking screw 45. The distance between pistons 12 and 13 may be varied by loosening screw 45 and moving the piston 13 through aperture 44. This variation of the distance between the pistons 12 and 13 will, of course, vary the length of the formed material unit.

The horizontal member 41 is formed with a vertically upwardly extending lug 46 which is connected through a roller bearing to the crank arm 35 of the drive means 14. The pistons 12 and 13 are thereby caused to reciprocate in the manner previously described relative to the tube 11.

Figure 2:
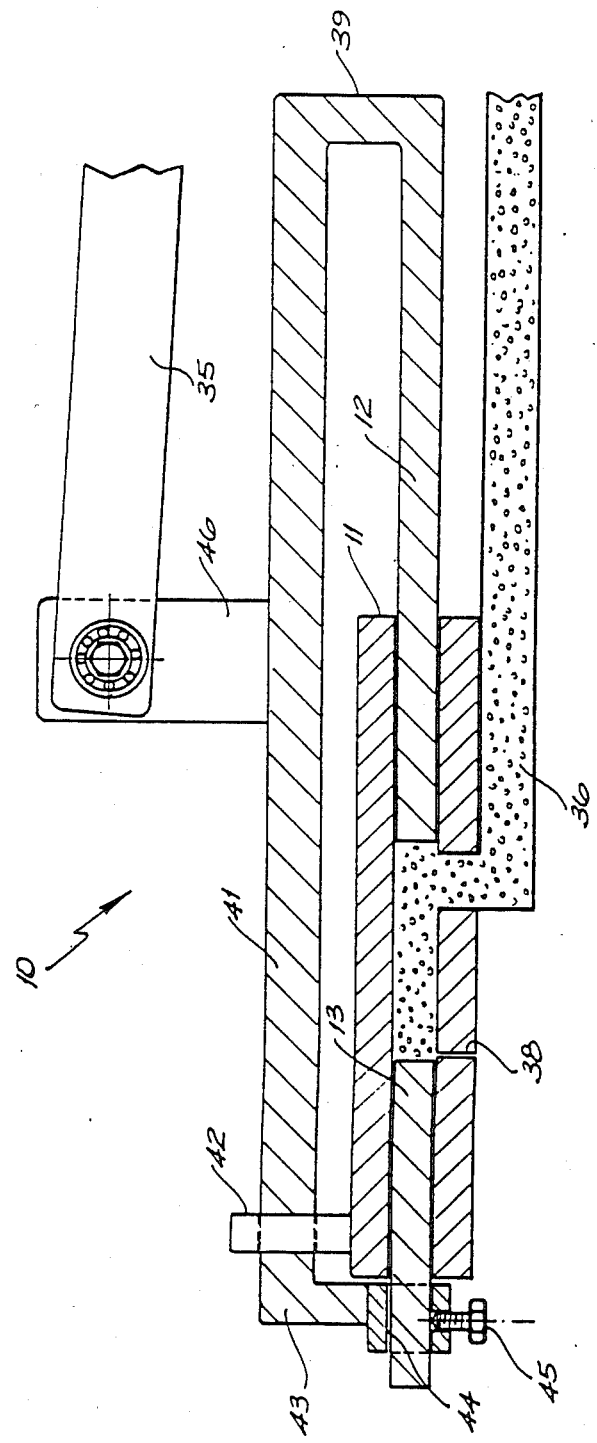
FIG. 2 is a detailed diagrammatic cross-sectional view of the tube and pistons of the apparatus of FIG. 1 in a position in which the space between the pistons is being filled with material.

In operation as the pistons 12 and 13 are drawn back (to the right as seen in FIGS. 1 and 2) through the tube 11 the inlet port 37 will be uncovered and the meat paste will flow into the bore of the tube 11 while displacing air through bleed hole 38. The meat paste will be contained within the tube 11 between the pistons 12 and 13. As the pistons 12 and 13 are then moved out of the tube (to the left as seen in FIGS. 1 and 2) the unit of meat paste within the tube 11 will be severed from the paste supply at the inlet port 37. When the active faces of the pistons 12 and 13 are both clear of the tube 11 the unit of formed material 47 will be free to fall clear of the pistons 12 and 13 as seen in FIG. 1. A tube 48 is provided to spray a release agent such as water or batter onto the free end of piston 12 as each unit 47 is ejected from the tube 11.

What is claimed is:

1. An apparatus for forming paste-like materials into discrete product units comprising an elongate, open ended tube of substantially constant internal cross-sectional shape, an inlet port through the wall of the tube intermediate its ends to allow the entry of paste-like material into the interior of the tube, a piston means including first and second piston members spaced apart in axial alignment and adapted to be moved together relative to the tube between a first position in which the space between them is effectively external of the tubes and a second position in which that space is completely within the tube and in communication with the inlet port therein, the apparatus further including means adapted to cause the piston members to undergo a short oscillation when at the first and/or second positions.

2. An apparatus as claimed in claim 1 in which the means adapted to cause the piston members to undergo a short oscillation when the first and/or second positions comprises a crank arm pivotably connected to the piston means and pivotably connected to an arc lever, the arc lever being connected to drive means adapted to cause it to oscillate about an axis normal to the axis of reciprocation of the piston means through an arc of more than 180° C.

3. An apparatus as claimed in claim 1, in which the piston members are joined together externally of the tube in a manner such that the distance between the opposed faces of the axially aligned pistons may be varied to enable the length of the discrete product units to be correspondingly varied.

4. An apparatus as claimed in claim 1 in which a lubricant is applied to the ends of the piston members in contact with the product units.

5. An apparatus as claimed in claim 1 in which the paste-like material is supplied to the inlet port by a line connected to the inlet port and a pressurized source containing the said material.

6. An apparatus as claimed in claim 1, in which the tube has an air bleed hole intermediate the inlet port and the open end of the tube.

* * * * *